US008875137B2

(12) United States Patent
Kaufmann et al.

(10) Patent No.: US 8,875,137 B2
(45) Date of Patent: Oct. 28, 2014

(54) CONFIGURABLE MASS DATA PORTIONING FOR PARALLEL PROCESSING

(75) Inventors: Artur Kaufmann, Landau (DE); Georg Lang, Ludwigshafen Am Rhein (DE)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 13/225,504

(22) Filed: Sep. 5, 2011

(65) Prior Publication Data

US 2013/0061026 A1 Mar. 7, 2013

(51) Int. Cl.
*G06F 9/46* (2006.01)
*G06F 9/48* (2006.01)

(52) U.S. Cl.
CPC .................................. *G06F 9/4843* (2013.01)
USPC ........... 718/100; 718/102; 718/105; 707/600; 707/765

(58) Field of Classification Search
None
See application file for complete search history.

(56) References Cited

U.S. PATENT DOCUMENTS

| | | | | |
|---|---|---|---|---|
| 6,415,297 B1* | 7/2002 | Leymann et al. | ............. | 707/608 |
| 6,772,163 B1* | 8/2004 | Sinclair et al. | ......... | 1/1 |
| 2004/0098390 A1* | 5/2004 | Bayliss et al. | ..... | 707/7 |
| 2005/0223109 A1* | 10/2005 | Mamou et al. | ................ | 709/232 |
| 2005/0240354 A1* | 10/2005 | Mamou et al. | .................. | 702/19 |
| 2006/0173926 A1* | 8/2006 | Kornelson et al. | ............ | 707/200 |
| 2007/0083850 A1* | 4/2007 | Kapoor et al. | ................ | 717/106 |
| 2009/0313311 A1* | 12/2009 | Hoffmann et al. | ............. | 707/204 |
| 2010/0115246 A1* | 5/2010 | Seshadri et al. | .............. | 712/225 |
| 2012/0150791 A1* | 6/2012 | Willson | ....................... | 707/600 |

* cited by examiner

*Primary Examiner* — Emerson Puente
*Assistant Examiner* — Dong Kim (57) ABSTRACT

A configurable mass data portioning for parallel processing is described herein. One or more operation attributes are selected to participate in parallelization criteria. The values of the selected operation attributes for a number of operations are submitted to a specified algorithm using to provide parallelization values corresponding to the operations. The parallelization values are applied to group the operations in comparable portions for parallel execution without conflicts.

18 Claims, 6 Drawing Sheets

CONFIGURABLE MASS DATA PORTIONING FOR PARALLEL PROCESSING

BACKGROUND

Companies or any other business entities offer goods or services to at least one client. Business transactions have to be processed, and—especially for larger companies with many customers—the transactions are processed by multiple computer systems. In such systems, recurrent execution of similar processing operations is common. Therefore, the automation of business processes by utilizing various computer systems often involves recurrent executions of large numbers of similar operations. For example, the daily purchases in a chain of retail stores pile up to be settled by mass posting of the corresponding records to the company's general ledger and contractor's accounts. Usually, the mass activities, e.g., processing of similar type operations, impact the performance and availability of the computer systems of the companies. One common approach to facilitate mass activities is by parallelizing. The volume of atomic operations to be executed is broken into subsets or portions, and the different portions of operations are executed simultaneously by different computer system processes threads.

Generally, the parallelization of mass activities is a very efficient method to optimize the performance of the computer systems. However, the parallel execution requires careful analysis of the mass operations before splitting them in intervals to guarantee data consistency during the parallel processing, and to avoid futile competition for shared resources or deadlocks. Additionally, the mass activity operations have to be evenly portioned to assure parallel run during the entire execution time. Usually, the current methods for parallel mass processing involve extensive preprocessing to identify safe and efficient grouping of the operations. Alternatively, some computer system solutions apply simple parallelization criteria for grouping the mass operations, e.g., based on contract accounts. However, such simple solutions do not provide equal distribution of the operations, especially for recurrent mass processing scenarios. For example, the number of transactions attributed to different contractors may differ drastically in a mass activity session, as well as between different mass activity sessions.

SUMMARY

Various embodiments of systems and methods for configurable mass data portioning for parallel processing are described herein. One or more operation attributes are selected to participate in parallelization criteria. According to one aspect, parallelization values for a number of operations are computed based on the corresponding values of the selected operation attributes. According to another aspect, the parallelization values are used to split the operations in comparable portions for parallel execution. According to yet another aspect, the portions of operations are executed simultaneously by process threads running in parallel. An aggregated result could be generated after the parallel execution of the portions of operations.

These and other benefits and features of the embodiments will be apparent upon consideration of the following detailed description of preferred embodiments thereof, presented in connection with the following drawings.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for configurable mass data portioning for parallel processing are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
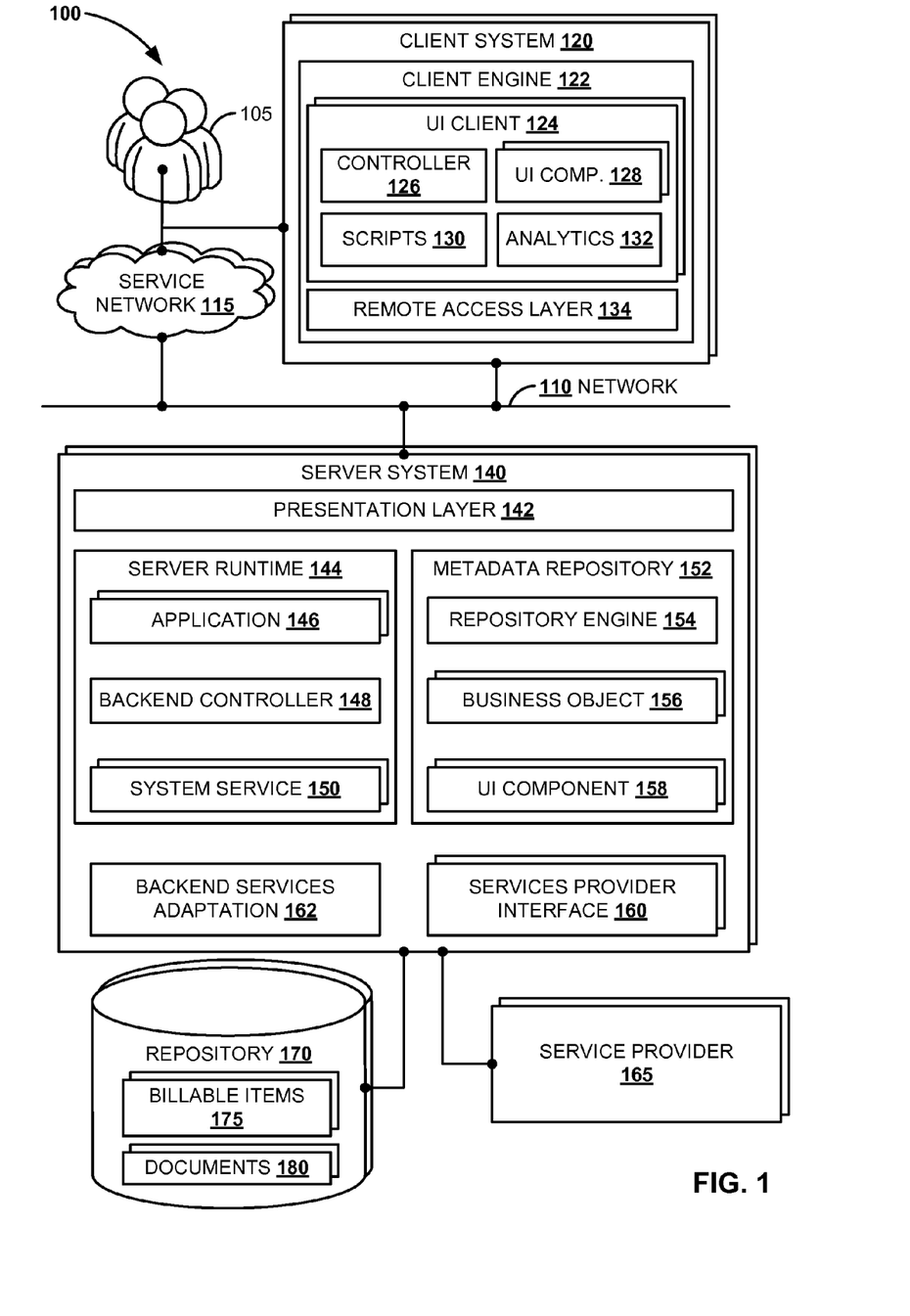
FIG. 1 is a block diagram of a computer system landscape where configurable portioning of mass data for parallel processing is implemented, according to one embodiment.

FIG. 1 is a block diagram showing computer system landscape 100 where configurable portioning of mass data for parallel processing is implemented, according to one embodiment. The computer system landscape 100 shows a rather simplified example of classic client-server architecture. One or more shareholders or users 105, e.g., customers, end users, system administrators, etc., operate on one or more client systems 120. Users 105 may request different services or execute various operations available within client systems 120, or provided by one or more server systems 140 via network 110. The illustrated server systems 140 represent one or more backend nodes in the computer system landscape 100. Alternatively, users 105 may request services or execute operations through one or more service networks 115. For example, one of the service networks 115 may be provided by a mobile operator offering voice and data services. In one embodiment, client systems 120 may represent mobile or handheld devices, tablets, personal computers, various computer terminals, etc., connected to server systems 140 via network 110 or via service network 115, or both.

The client systems 120 and the server system nodes 140 communicating via network 110 may define a number of different computer system environments. Some of the elements of the computer system landscape 100 resemble the structure and functionality of software modules developed by SAP AG. However, structures with similar functionalities could be found in computer products developed by other vendors, as well. Alternative embodiments may utilize other kinds of computer system architectures.

The involved client systems 120 may have similar or different structures where one or more of the illustrated modules are replicated. One or more users 105 may operate within one or more instances of user interface (UI) client 124 of one or more of client systems 120. Different users 105 may exclusively access different instances of the UI client 124 within the same client system 120.

In one embodiment, any of client systems 120 may execute a standalone client application, e.g., client engine 122, to interact with the backend server system 140. Alternatively, an intermediate layer may be downloaded to any of the client systems 120 as an extension of a running Internet browser. The functionality of such intermediate layer may be also illustrated by client engine 122. The standalone client application and the intermediate layer may have similar components and functionality. Client engine 122 takes responsibility for rendering the necessary client functionality, and also for communicating with server systems 140 via network 110 when necessary.

The client engine 122 includes one or more UI client instances or sessions 124 that may also embed into a browser integrated framework. The UI clients 124 may be a part of any popular browser integrated framework, e.g. Silverlight® provided by Microsoft Corp, Flex® provided by Adobe Systems Inc., JavaFX® originally developed by Sun Microsystems Inc., etc. In one embodiment, the client engine 122 and UI client 124, respectively, may be a desktop application, for example, a .NET® application rendering a UI through a Windows Prosecution Foundation (WPF) system. The UI client 124 accesses the necessary business functionality and data at the backend 140 through remote access layer 134 via networks 110 directly or through service network 115. In one embodiment, no dedicated UI server or client programs are needed. The communication with the backend 140 may include extracting, storing, uploading and updating data. The data may be transported to repositories 170, especially when backend 140 encompasses a number of server nodes in separate computer system environments.

In one embodiment, users 105 generate services requests at UI client 124. UI components module 128 instantiates one or more appropriate graphical user interface (GUI) screens or controls in response to the user request. The behavior of the UI components is managed by controller 126. The controller 126 makes sure that all instantiated controls in the UI components 128 are initialized. The controller is also responsible for the execution of any configured operation triggered by events corresponding to the instantiated controls. In case when some of the operations involve execution of script segments, the controller 126 may trigger the execution of these scripts via scripts module 130. In one embodiment, scripts module 130 is a frontend scripting engine. Analytics module 132 may be used for frontend data processing when necessary.

In one embodiment, the backend 140 utilizes presentation layer 142 to connect to the Internet and/or to other public or private networks, and to provide access for the UI client sessions 124 to underlying business functions and data structures. For example, the presentation layer 142 may generate the UI object model underlying the UI controls instantiated by the UI components module 128 at the client systems 120. In one embodiment, presentation layer 142 may be part of the server runtime 144.

The server runtime 144 provides environment where one or more software applications 146 are executed. For example, the applications 146 may be responsible for enabling a number of business services. Various operation requests related to the business services may be created or posted at client systems 120 and/or at service networks 115. The requests are translated to corresponding process tasks performed by the applications 146 executed in server runtime 144. In one embodiment, applications 146 may process mass activity operations generated at client systems 120 or within service networks 115 in response to different events, e.g., billing of consumed services.

In one embodiment, the server runtime 144 includes backend controller 148 for one or more UI client sessions 124 to handle the requested UI components, e.g., when a UI client session 124 triggers an initialization of a UI component 128 for the first time. The backend controller 148 may manage the collaboration between the requested UI components and one or more underlying business objects. System services 150 in the server runtime 144 may be used to administer the characteristics of the server runtime 144, e.g., its engine parameters, the user access to one or more components, the processes execution, the communication with other runtime environments, such as external systems, databases, etc. In one embodiment, system services 150 may also provide deployment, setup and change management of software components.

Metadata repository 152 is generally the place where metadata about the computer programs deployed in the server system 140 is preserved, according to one embodiment. There are different kinds of metadata that could be maintained by the metadata repository 152. For example, the repository 152 keeps the description of the business objects 156 underlying the applications 146. In one embodiment, metadata repository 152 keeps description of the available UI components 158 and the relationships between them as designed.

Repository engine 154 manages the metadata and the collaboration with the server runtime 144 at one hand, and with various service providers 165 at the other hand. The service providers 165 may render services and/or corresponding UI components to the backend 140 as defined in the metadata. The service providers 165 are available via service provider interfaces 160, and can be either internal or external to the backend 140. In one embodiment, backend services adaptation 162 represents a layer that helps to adjust the designed UI or rendered UI components to a set of normalized business objects available at the server system 140.

In a multi server system environment, e.g., in a cluster of more than one server system nodes 140, repository 170 may be used to persist different kinds of common data, including programming code, business data, metadata, etc. In one embodiment, one or more different repositories 170 may be assigned to different computer system environments defined in the computer system landscape 100

In one embodiment, users 105 may design, create or change a program component, a data object or some other type of computer system artifact by manipulating UI components 128 associated with particular application or software tool. The UI components 128 may be available within GUI environment of the UI client 124. The manipulations of the UI components 128 may lead to changing the metadata repository 152, e.g., changing the definitions of the UI components 158, even changing the descriptions of the business objects 156, etc. Further, the manipulations of UI components 128 may trigger execution of various system or application procedures in server runtime 144, e.g., background mass activity processing.

For example, by manipulating UI components 128 and/or by directly consuming services in service networks 115, users 105 may generate a number of atomic operations that line up to be mass processed by applications 146 running in service system 140. Additionally, mass activity operations may be generated within server systems 140, e.g., as a result of various business processes, and/or received from external systems, such as service providers 165. The server systems 140 may store such operations in one or more shared repositories 170 as, for example, billable items 175. The results of mass activities may be also stored in shared repositories 170, e.g., billing or invoicing documents 180.

Billing is one of the common examples for mass activity in the enterprise computer system environments. Generally, the billing process involves executing one or more unitary operations and generating electronic bills, invoices, presentment and payments. Billing processes, in one form or another, exist in virtually every industry. Usually, financial data about business transactions or operations is collected for a predefined period of time and mass processed. There are other scenarios of mass activities, e.g., bulk processing of other types of operations, that may be implemented or supported by various computer system environments as well, e.g., in computer system landscape 100. In this document most of the provided examples and descriptions refer to billing process. However, a specialist in the art would recognize that same ideas apply to other kinds of computer system mass activities, where better performance and efficiency are achievable through parallelizing.

In one embodiment, billing in combination with invoicing in contract accounts receivables and payables provides a high-performance backend solution for the mass creation of bills based on rated usage events called billable items. A "billable item", or just "item" in this document, is a data structure that represents a specific instance of commercial use or consumption of goods and/or services of any kind For example, in telecommunications, billable items are data structures that represent phone calls to be billed, text messages to be billed, data transfers to be billed, etc. Other examples may include electronic toll invoicing, e.g., a segment of a toll route (highway, mountain pass, etc) that was captured electronically and is to be billed, use of parking garage that is to be billed as a telephone call, downloads, electronic toll street usage, etc. In internet sales scenarios, one or more billable items are generated per each download with the corresponding payments and receivings, per purchase of a voucher usable for future downloads, per usage of a voucher for download of rated contents, etc.

Often, the billable items are generated, outside the computer system where they are processed (e.g., outside server system 140). Billing streams may be generated in specialized system environments (e.g., service providers 165), rated according to the individual consumption, and executed (e.g., by applications 146 at server runtime 144) as background or foreground mass processes. Billable items from different billing streams may be grouped on an individual basis to meet customer or corporate requirements.

To optimize system performance, billing mass activities may be parallelized. Typically, the parallel processing of billable items is based on contract account level as this is predetermined by the billing and invoicing documents, where the consolidation of billable items is based on contract accounts. Thus, the billable items regarding same contractor are billed and invoiced in a single process thread. The billable items are usually parallelized dynamically, at the startup of the mass activity, including all billable items that are currently ready for billing. Depending on the industry and the contractor characteristics, thousands and even millions of billable items in a billing stream may pertain to a single contractor, whereas only a few billable items for other contractors may be present in the same stream.

For example, a company is operating a music platform in cooperation with a few music companies, e.g., with contractors "A" and "B" that promote music. Several millions of online customers may each consume a few music downloads per month. Customers may consume music from contractor "A" only, from contractor "B" only, or from both "A" and "B". Besides debiting each customers' account for the few downloads, up to several million charges for the downloads have to be credited to "A" and/or "B". Obviously, the parallelization based solely on contract level may not provide efficient performance, as some of the parallel process threads will run much longer than others. Accordingly, other parallelization criteria should be applied to achieve evenly distributed workload between the parallel processes based on comparable intervals of billable items. To further ensure efficiency, parallelization criteria should not be applied dynamically at mass processing startup because of the performance critical analysis investigating the safe splitting of the billable items to even portions.

Parallelization criteria should to be configured to ensure splitting the billing streams into evenly distributed portions of billable items. The parallelization criteria is required to guarantee that the parallel execution of billable items will not generate errors, inefficient resource sharing, or inconsistency in data, especially in the accounting information. For example, if the billable items for crediting a promoter company for millions of music downloads are portioned based on the date and time of download, the respective billing stream may be evenly parallelized without conflicts.

Similar to virtually every computer application entity, mass activity operations are characterized by a number of properties or attributes. For example, one of the properties of the billable items is contractor identification, e.g., a customer that is billed and/or invoiced. The mass activity operations, such as billable items, have different kinds of attributes. Some of these attributes classify the operations by one or more qualities, e.g., technical characteristics, pertinent business process, billing sub-process, etc. Other attributes provide quantitive characteristics of the operation, e.g., date of execution, rate (billing amount), etc. In one embodiment, a set of mass activity operations may be parallelized based on the values of one or more of their common properties.

Figure 2:
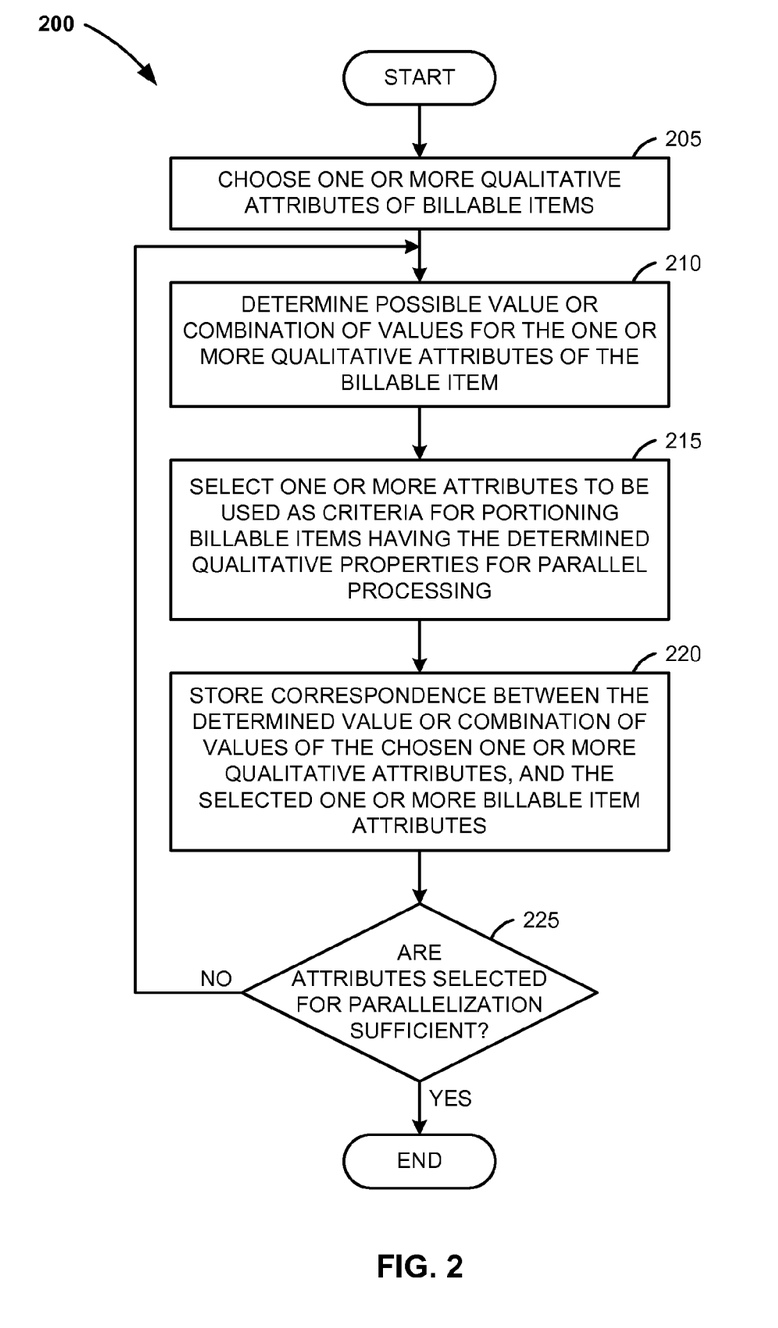
FIG. 2 is flow diagram illustrating a process for selecting a number of billable items attributes to be used for configuring parallelization, according to one embodiment.

FIG. 2 shows process 200 for selecting a number of billable items attributes to be used for configurable parallelization of billing streams, according to one embodiment. At 205 one or more qualitative attributes of billable items processed in a computer system are chosen. In one embodiment, every qualitative property may receive predetermined set of discrete values. Billable items with identical values of one or more of their qualitative properties may naturally classify in a same group of billable items.

Qualitative properties may identify technical attributes, such as database tables in which the computer system saves the billable items, dependent on their status and the stream they belong to; function modules that receive the billable items; function modules that save the billable items to the appropriate database tables; specific fields of billable items that are added either by customer selection of user interface components or using customer fields; etc. Further, qualitative properties may specify a business process, e.g., which business transactions a billable item supports, such as deferred revenues and down payment clearings. From technical perspective, the business process specification may include description, selection of necessary fields; specification of dependent/prerequisite interface components, along with checks, derivations, and assignments of field values; etc.

In one embodiment, billing sub-process and billable item type are among the qualitative properties that are better suited for underlying parallelization criteria. The billable item type may specify the business significance of the operations from the perspective of the company offering the consumed goods and/or services. For example, billable items corresponding to charging phone calls or text messages for a telecommunication company may be of different importance, and respectively, of different types. Billing sub-processes specify independent branches of the billing process in the computer system, e.g., billing of royalties, revenues, phone calls, internet downloads, etc.

At 210, a possible value or a combination of values for the chosen one or more qualitative attributes are determined. The determined value or combination of values distinguishes the billable items having the same value or combination of values for the chosen attribute or attributes. At 215, one or more of the other billable item attributes are selected to be used as criteria for portioning the billable items having the determined qualitative properties for parallel processing. In one embodiment, the attributes to be used for portioning of billable items are selected in a manner avoiding conflicts or errors when the billable items from different portions are executed in parallel. Generally, the identification and selection of such billable items attributes depend on the characteristics and functionality of the billing process. For example, such properties may be date of consuming the billable services or goods, the customer account used for billing, etc.

A correspondence between the determined value or combination of values of the chosen one or more qualitative billable item attributes and the selected one or more billable items attributes is stored at 220. In one embodiment, the correspondence may be stored in a dedicated data structure where the chosen one or more qualitative attributes correspond to one or more fields of the data structure, and the value or combination of values for the chosen qualitative attribute/s are persisted as contents of the field/s. The selected one or more billable item attributes to be used as parallelization criteria may be stored as contents of one or more parallelization criteria fields of the data structure. Table 1 shows an example definition of a data structure for storing correspondence between the determined value or combination of values of the chosen one or more qualitative billable item attributes, and the selected one or more billable items attributes:

Choosing sub-process as a qualitative property in the example of Table 1 may assure that the billing items in a single portion are part of the same sub-process. At 225, a check is performed to verify whether the selected billable item attributes for parallelization are sufficient. The selected billable item attributes are sufficient when a parallelization criteria based on these properties would split a number of billable items in comparable portions for parallel processing. When the selected billable item properties are deemed insufficient, e.g., by the user configuring the parallelization criteria, process 200 goes back to 210 where another possible value or combination of values for the one or more qualitative billable item attributes is determined. Respectively, at 215, one or more billable item attributes are selected to be used as portioning criteria for the chosen qualitative properties, etc. Process 200 ends when it is verified at 225 that the selected billable item attributes are enough for efficient parallelization.

In one embodiment, the process 200 may be reduced only to directly selecting one or more billable item attributes to be used by the parallelization criteria, without choosing one or more qualitative attributes, determining their value or combination of values, and storing the respective correspondences.

Usually, the operations to be mass processed at a computer system are received within a period of time, and often are collected from different sources, e.g., service providers. For example, in some cases billable items are received ready for execution, while in other cases the billable items have to be generated from raw billing data. A billable item can have different statuses at different processing stages. For example, "billable" status may be assigned to the billable items considered ready for execution. Once these items are successfully processed during billing, the computer system renders them "billed" status. In one embodiment, the various billable item statuses are reflected on a technical level using different database tables, e.g., there is separate database table for each billable item status. For example, when the computer system receives billing data, it may be directly added to a table with billable items ready to be processed, or may be added to a table with raw billing data. The billing data may be also returned to the source system or application if errors are detected. These activities may be performed as a part of a billable item management process running at the computer system where the billing is executed.

In one embodiment the parallelization of the billable items for execution may be done dynamically as part of the mass activity process. However, such dynamic parallelization would consume mass activity process time and computing resources for applying the parallelization criteria on the pending set of billable items. As a result, the effect of parallelization may be largely diminished. A better scenario is to portion the billable items for parallel execution before the mass activity process start. For example, the billable items may be prepared for portioning during the billable item management process, according to one embodiment.

TABLE 1

Customizing table TFK8104P (Specific to SAP AG Enterprise Resource Planning (ERP) landscape)

| Key | Field | Data Element | Domain | Description |
|-----|-------|--------------|--------|-------------|
| X | MANDT | MANDT | | Unique identifier of computer system client |
| X | SUBPROCESS | SUB_PROCESS_KK | | Chosen qualitative BIT property |
| | KEYPP_CRIT1 | KEYPP_CRIT1_KK | Char 30 | First BIT property for parallelization criteria in billing |
| | KEYPP_CRIT2 | KEYPP_CRIT2_KK | Char 30 | Second BIT property for parallelization criteria |
| | KEYPP_CRIT3 | KEYPP_CRIT3_KK | Char 30 | Third BIT property for parallelization criteria |
| | ... | ... | ... | ... |

Figure 3:
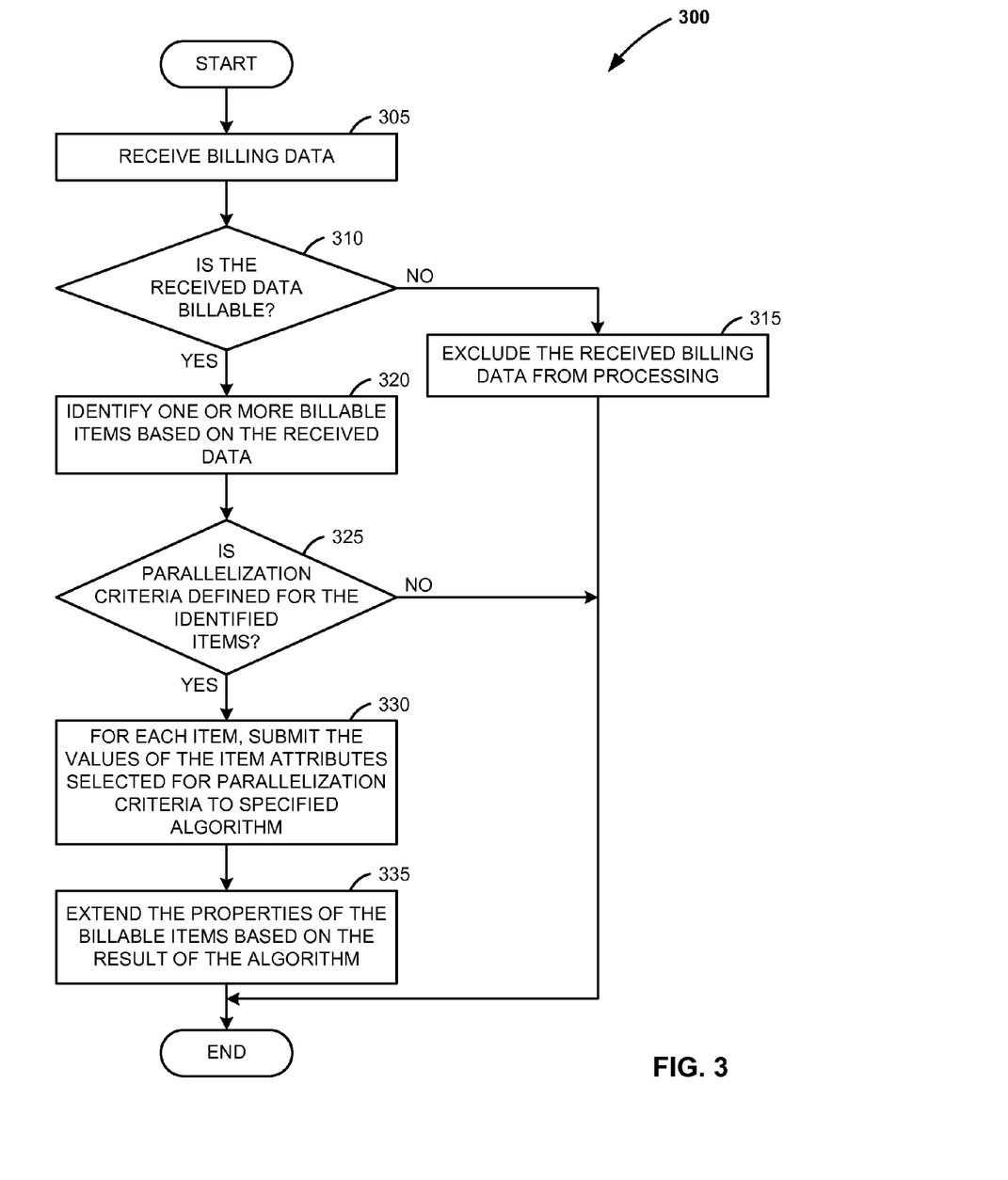
FIG. 3 is a flow diagram illustrating a process for preparing billable items to be portioned as configured, according to one embodiment.

FIG. 3 shows process 300 for preparing billable items to be portioned as configured for execution in parallel threads, according to one embodiment. At 305, billing data is received at a computer system, e.g., at a billable item management process. In one embodiment, the billing data may be received from one or more external systems sources, or generated internally. At 310, it is verified whether the received data is billable. For example, the received data may be checked for consistency and completeness. If the received data is not billable, it is excluded from further processing at 315. If the received data is correct, and respectively billable, it is used to identify one or more billable items at 320. Depending on the structure of the received billing data, the billable items may be in some cases directly determinable, whereas in other cases the billable items may be determined after pre-processing of raw billing data.

At 325, a check is performed to verify whether parallelization criteria is defined for the one or more billable items determined from the received billing data. In one embodiment, the properties of the one or more determined billable items are compared with a number of billable item properties selected to be used for parallelization. When there is defined parallelization criteria, at 330, a specific algorithm is performed for each of the determined one or more billable items. In other words, the specific algorithm is executed for each billable item for which parallelization criteria is set. The values of the billable item attributes selected for the parallelization criteria are submitted as input data to the specified algorithm.

In one embodiment, for each billable item, the algorithm provides one or more parallelization values resulting from the attributes assigned for parallelization criteria. Mass activity operations may be parallelized based on the parallelization values calculated by the specific algorithm for each of the operations using the values of one or more selected attributes. For example, the algorithm may involve the execution of a hash function receiving a string generated based on the values of the selected attributes for a particular billable item. The result of the execution of the hash function may be a parallelization value for the particular billable item.

In one embodiment, the exact structure of the specific algorithm for parallelization could be user defined to ensure even distribution of the parallelization values. However, such algorithm should guarantee that same parallelization value is assigned to operations for which it is necessary to be executed in a single process thread. For example, billable items with same values of the selected attributes for parallelization may have to be grouped together, and therefore, the specific algorithm should generate similar results. Further, even if the values of the attributes of the billable items selected for parallelization are different, the specific algorithm may have to provide similar results when the billable items are linked on different basis, e.g., billable items for the same contract account.

At 335, the properties of the received and determined billable items are extended based on the result of the algorithm performed for each of the billable items. In one embodiment, at least one new parallelization attribute is added to the billable items to assign at least one parallelization value calculated for the billable item. For example, the determined billable items are stored in a database table including an additional field or column to store the calculated parallelization values for each billable item. In one embodiment, the new parallelization attribute of the billable items may be set to a function of the calculated parallelization values to guarantee easier portioning of the billable items in a predefined number of intervals. If, for example, the determined billable items should be split up to a thousand portions, the parallelization property of the billable items may be set to the last three digits of the corresponding parallelization values.

Figure 4:
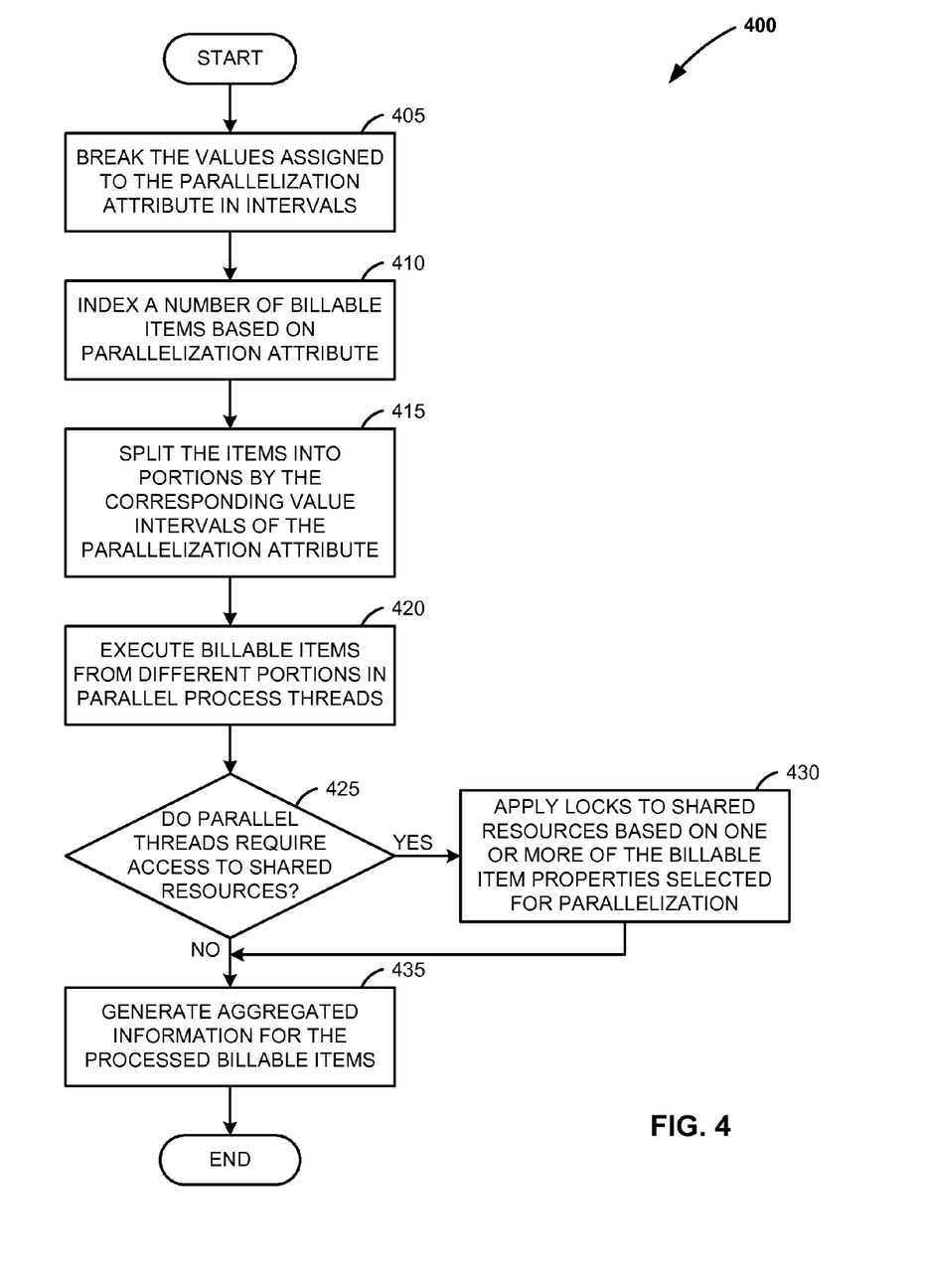
FIG. 4 is a flow diagram illustrating a process for executing a stream of billable items in parallel, according to one embodiment.

Once the properties of the mass activity operations are extended with a parallelization attribute set to corresponding parallelization values, the parallel processing may commence without prolonged pre-processing to evenly portion the operations. FIG. 4 shows process 400 for executing a stream of billable items in parallel, according to one embodiment. The process 400 starts at 405 with breaking the values assigned to the parallelization attribute of the billable items in intervals. In one embodiment, the values assigned to the parallelization attribute for the different billable items are used to define predetermined breaking points to set boundaries for the different intervals, and respectively, to the portions of operations for parallel processing.

In one embodiment, the value intervals may be configured before the execution of the stream of billable items. Furthermore, the value intervals may be configured even before receiving the billable items and applying the parallelization criteria. For example, if the possible values resulting from the parallelization algorithm fall within a projected range, the value intervals may be predefined within that range presuming even portioning of the expected billable items. For example, if the range is from "0" to "999", up to a thousand value intervals may be predefined.

At 410, a number of billable items lined up for execution are indexed based on the parallelization attribute. In one embodiment, the billable items ready for execution are stored in a database table including parallelization field storing the corresponding parallelization value for each of the billable items. The table index may include the parallelization attribute field to ensure time efficient splitting of the billable items into comparable portions by the corresponding value intervals of the parallelization attribute at 415.

The billable items from different portions are executed in parallel process threads at 420 as part of the mass activity processing. At 425, a check is performed to determine whether the parallel threads executing billable items from different portions require access to shared resources. Usually, such access is required as the operations involved in mass activity are more or less related to the same business objects. Moreover, a shared resource may be a database table storing the billable items. In case where such access is required, the shared resource has to be locked for exclusive use by one of the parallel process threads to avoid data inconsistencies.

However, such exclusive locking of the entire shared resource may undermine the purpose of parallelization by serializing the parallel operations and thus deteriorating the execution efficiency. To avoid this effect, at 430, locks are applied to shared resources based on one or more of the billable item properties selected for parallelization that correspond to properties of the shared resource. The locking may include one or more of the qualitative properties chosen at 205, as well as of the billable item properties selected to be used as the parallelization criteria at 215 of process 200 illustrated with FIG. 2. For example, billing royalties and revenues are performed by different billing sub-processes. Thus, billing royalties and billing revenues for the same account do not hinder themselves by having a lock on sub-process level.

Process 400 ends with generating aggregated information for the operations processed in parallel at 435. For example, the result of billable items for a same contractor processed in parallel may be presented in a same billing document or in a same invoice. Further, the result of parallel mass processing may be consolidated and posted, for example, to the general ledger as a single thread operation.

Figure 5:
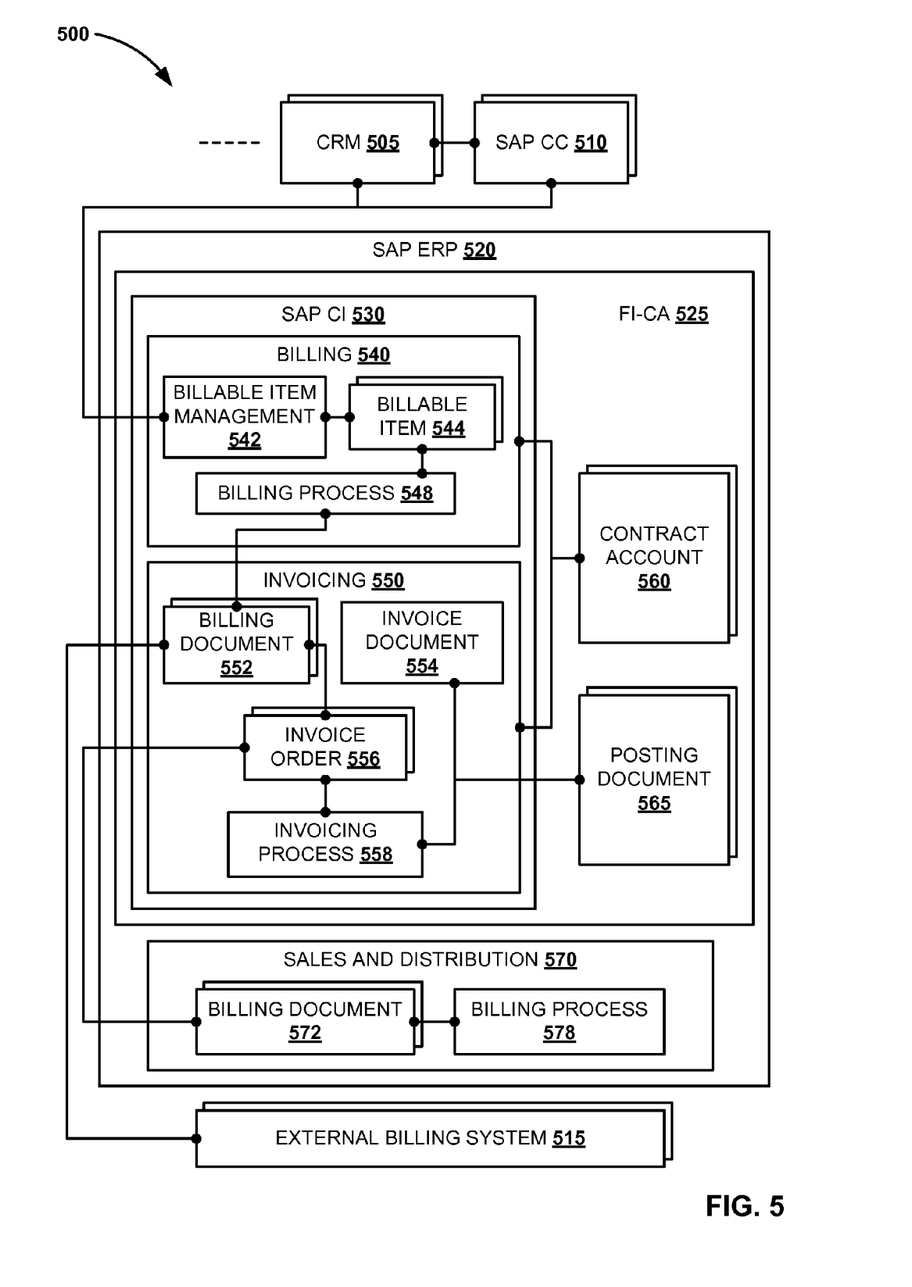
FIG. 5 is a block diagram illustrating a computer system environment where configurable portioning of mass data for parallel processing is implemented, according to one embodiment.

FIG. 5 shows computer system environment 500 where configurable portioning of mass data for parallel processing is implemented, according to one embodiment. The system landscape 500 includes computer systems and functional modules relevant to SAP AG developed enterprise technology. However, a specialist in the art would recognize that similar ideas and functionality may be realized in computer system landscapes built on different computer system environments.

In one embodiment, SAP AG developed Convergent Invoicing application (SAP CI) 530 is a module of Contract Accounts Receivable & Payable (FI-CA) 525 application, part of SAP AG developed Enterprise Resource Planning (SAP ERP) system 520. The main purpose of SAP CI 530 is to create a convergent bill where billing data from various sources is aggregated into a single invoice and is processed together. The billable items may be passed to SAP CI 530 from different source systems. For example, billable items may be received from a Customer Relationship Management (CRM) system 505, e.g., generated as a part of a contract management activities. Some billable items may be sent directly to the billable item management process 542 of the billing module 540 of SAP CI 530. Others may be routed through SAP AG developed Convergent Charging (SAP CC) 510 for rating and account balance management.

The billing module 540 of SAP CI 530 processes transactions and additional data from other systems and creates structured bill content. Billing 540 provides billable item management 542 that allows transferring, store and monitoring billable items 544, and preparing them for billing execution. The billing process 548 covers the handling of billable items 544 for the purpose to create, simulate and reverse billing documents 552. Extensive customizing to configure and schedule the billing process is available, according to one embodiment.

The billable items coming from different sources may have different billing statuses. In one embodiment, the billing data received at the billable item management 542, regardless whether it is in a raw state or in a ready to be billed state, is augmented with parallelization property. For each determined billable item, the parallelization property may be set to a parallelization value derived based on predefined parallelization criteria. The parallelization criteria may be configured based on one or more user selected attributes of the billable items, according to one embodiment. Further, the algorithm for calculating the values of the parallelization property of the billable items may be programmed or configured, e.g., via a graphical user interface.

The billable items 544 received at SAP CI 530 may be stored in one or more data structures depending on their billing status. In one embodiment, the billable items that are ready for execution are split in comparable portions based on the parallelization property. The execution of the portions of billable items by parallel threads of billing process 548 may result in generation of a number of billing documents 552. Each billing document 552 may correspond to a single portion of billable items 544, according to one embodiment. Alternatively, the billing documents may aggregate information from different portions of billable items, or more than one billing document may be generated based on the billable item executed in a portion by a single billing process thread.

Invoicing 550 allows creation of convergent customer invoices merging billing information from SAP billing systems such as billing 540, FI-CA 525, and billing systems from other providers, e.g., external billing systems 515. The billing documents 572 generated by billing process 578 of the SAP ERP 520 component Sales and Distribution (SD) 570 are directly integrated into invoicing 550. Invoicing process 558 integrates the billing documents 552 and 572 in FI-CA 525, creates the invoice document 554 that saves the information for the invoice and that is the base for the physical invoice printings and posts.

Generally, billing documents 552 and 572 from different billing systems are selected, grouped and displayed together in one invoice. The billing documents 552 and 572 are transferred to posting documents 565 in FI-CA 525 synchronously. Current information for the contract accounts 560, such as open invoice receivables, can be displayed on the invoice 554. Invoicing orders 556 must exist for the invoicing process 558 to be started. The invoicing orders 556 are created when the billing documents 552 and 572 are created, and are used for specific selection of the billing documents 552 and 572 not yet processed by the invoicing process 558.

In one embodiment, the invoicing process 558 may execute the invoice orders 556 based on the billing documents 552 and 572 in parallel threads. For example, the unitary operations included in the invoice orders 556 correspond to the billable items 544, and configurable parallelization criteria for the invoicing 550 similar to the criteria for parallelizing the billing 540 may be defined. In one embodiment, the criteria for parallelization of the billing 540 predetermines the parallelization of the invoicing 550 because of the relation between the portions of billable items processed in parallel, and the generated billing documents 552.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
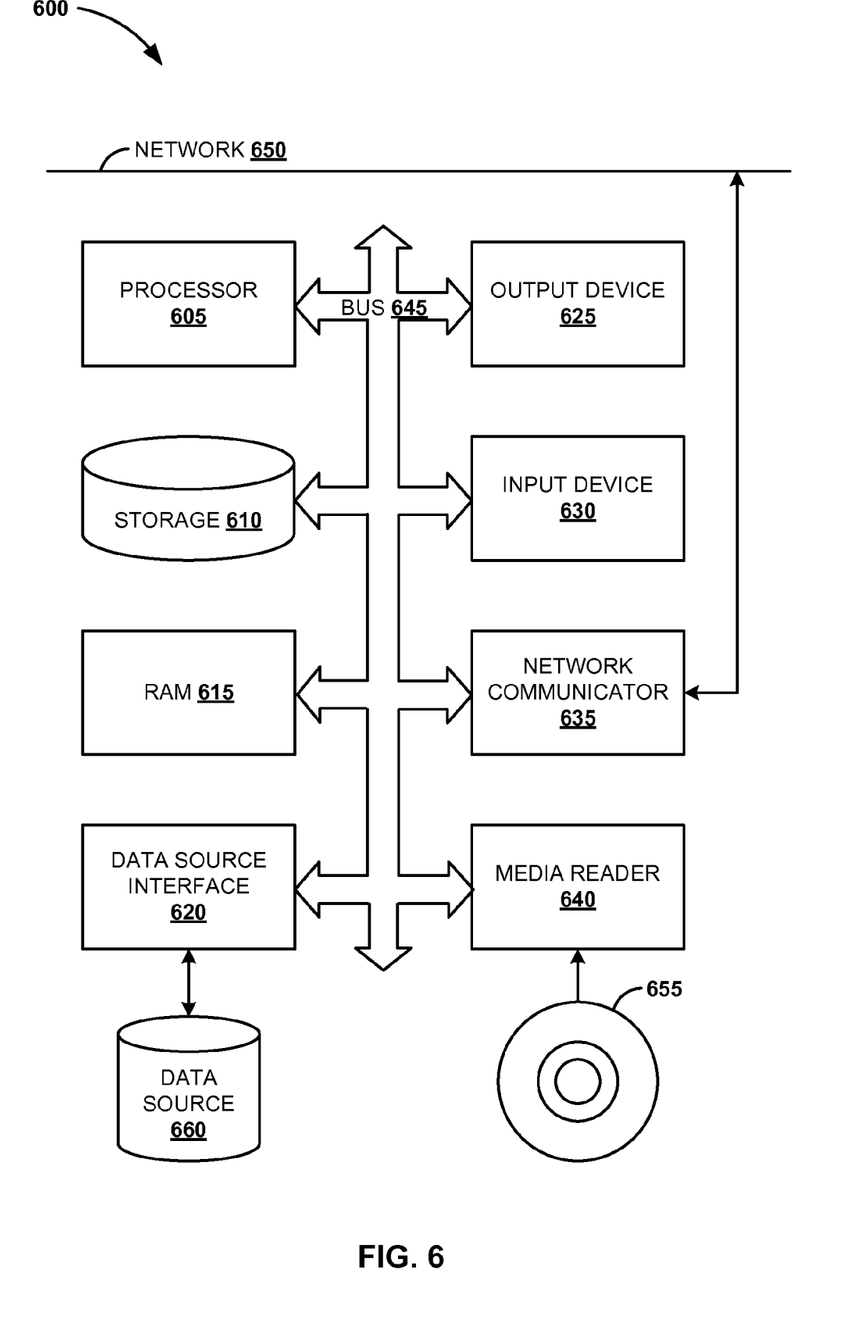
FIG. 6 is a block diagram of an exemplary computer system to execute configurable mass data portioning for parallel processing, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system for processing business transactions in parallel, the system comprising:
a memory device to store computer executable instructions; and
a processor communicatively coupled to said memory device and configured to execute said instructions to:
receive a selection of one or more qualitative attributes from a plurality of qualitative attributes;
in response to the selection, determine whether the selected one or more qualitative attributes meet at least one parallelization criteria, and when the selected one or more qualitative attributes does not meet said at least one or more parallelization criteria, iteratively select and examine one or more additional qualitative attributes to determine at least one qualitative attribute that meets at least one parallelization criteria sufficient for parallelization;
for the determined at least one qualitative attribute meeting said one or more parallelization criteria, compute a plurality of parallelization values;
determine a plurality of operations based on said computed plurality of parallelization values;
split said plurality of operations into a plurality of portions based on said plurality of parallelization values;
lock a shared resource based on said selected one or more qualitative attribute;
execute simultaneously said plurality of portions in a plurality of parallel process threads; and
generate a report including an aggregation of a plurality of results from said simultaneous execution of said plurality of portions corresponding to said plurality of operations.

2. The computer system of claim 1, further comprising generating a data structure, wherein the data structure comprises:
at least one field corresponding to at least one qualitative attribute to store at least one value of said one or more qualitative attribute; and
at least one field to store said at least one parallelization value corresponding to said at least one qualitative attribute.

3. The computer system of claim 1, wherein computing said plurality of parallelization values comprises:
executing an algorithm for determining said at least one operation from said plurality of operations based on said selected one or more qualitative attribute corresponding to the said parallelization criteria.

4. The computer system of claim 1, wherein said locking of said shared resource provides simultaneous access to said shared resource using said plurality of parallel process threads.

5. A non-transitory computer-readable medium storing instructions, which when executed cause a computer system to:
receive a selection of one or more qualitative attributes from a plurality of qualitative attributes, the plurality of qualitative attributes;
in response to the selection, determine whether the selected one or more qualitative attributes meet at least one parallelization criteria, and when the selected one or more qualitative attributes does not meet said at least one or more parallelization criteria, iteratively select and examine one or more additional qualitative attributes to determine at least one qualitative attribute that meets at least one parallelization criteria sufficient for parallelization;
for the determined at least one qualitative attribute meeting said one or more parallelization criteria, compute a plurality of parallelization values;
determine a plurality of operations based on said computed plurality of parallelization values;
split said plurality of operations into a plurality of portions based on said plurality of parallelization values;
lock a shared resource based on said selected one or more qualitative attribute;
execute simultaneously said plurality of portions in a plurality of parallel process threads; and
generate a report including an aggregation of a plurality of results from said simultaneous execution of said plurality of portions corresponding to said plurality of operations.

6. The computer-readable medium of claim 5, wherein receiving said selection of said one or more qualitative attribute comprises:
receiving at least one value of one or more qualitative attribute; and
storing a correspondence between said at least one value of said one or more qualitative attribute and said selected one or more qualitative attribute.

7. The computer-readable medium of claim 5, wherein computing said plurality of parallelization values comprises:
extracting at least one value of said selected one or more qualitative attribute corresponding to the said parallelization criteria; and
assigning said at least one value of said one or more qualitative attribute to a specified algorithm to derive at least one corresponding parallelization value.

8. The computer-readable medium of claim 5, wherein computing said plurality of parallelization values further comprises:
calculating a first result of a hash function with at least one input parameter set to at least one value of said one or more qualitative attribute for a first operation of said plurality of operations;
calculating a second result of said hash function with said at least one input parameter set to at least one value of said one or more qualitative attribute for a second operation of said plurality of operations; and
execute said first operation and said second operation based on said first result and said second result of said hash function.

9. The computer-readable medium of claim 5, wherein said splitting of said plurality of operations comprises:

grouping said plurality of parallelization values in a plurality of intervals; and
portioning said plurality of operations by said plurality of intervals.

10. The computer-readable medium of claim 5, wherein executing a first portion and a second portion of said plurality of operations simultaneously, comprises: accessing said shared resource by said plurality of parallel process threads based on locking said shared resource by said first portion and said second portion of said plurality of operations.

11. The computer-readable medium of claim 5, wherein generating said report including said aggregation of said plurality of results comprises:
consolidating a first result with a second result of said simultaneous execution of a first portion and a second portion of said plurality of operations.

12. A computer implemented method for processing business transactions in parallel, the method comprising:
receiving a selection of one or more qualitative attributes from a plurality of qualitative attributes, the plurality of qualitative attributes;
in response to the selection, determine whether the selected one or more qualitative attributes meet at least one parallelization criteria, and when the selected one or more qualitative attributes does not meet said at least one or more parallelization criteria, iteratively select and examine one or more additional qualitative attributes to determine at least one qualitative attribute that meets at least one parallelization criteria sufficient for parallelization;
for the determined at least one qualitative attribute meeting said one or more parallelization criteria, computing a plurality of parallelization values;
determine a plurality of operations based on said computed plurality of parallelization values;
splitting said plurality of operations into a plurality of portions based on said plurality of parallelization values;
locking a shared resource based on said selected one or more qualitative attribute;
executing simultaneously said plurality of portions in a plurality of parallel process threads; and
generate a report including an aggregation of a plurality of results from said simultaneous execution of said plurality of portions corresponding to said plurality of operations.

13. The computer implemented method of claim 12, wherein receiving said selection of one or more qualitative attribute comprises:
receiving at least one value of at least one qualitative attribute; and
storing a correspondence between said selected at least one qualitative attribute and said selected at least one value of said selected qualitative attribute.

14. The computer implemented method of claim 12, wherein computing said plurality of parallelization values comprises:
extracting at least one value of said selected at least one qualitative attribute; and
assigning said at least one value of said one or more qualitative attribute to a specified algorithm to derive at least one corresponding parallelization value.

15. The computer implemented method of claim 12, wherein computing said plurality of parallelization values comprises:
calculating a first result of a hash function with at least one input parameter set to at least one value of said one or more qualitative attribute for a first operation of said plurality of operations; and calculating a second result of said hash function with said at least one input parameter set to at least one value of said one or more qualitative attribute for a second operation of said plurality of operations.

16. The computer implemented method of claim 12, wherein splitting said plurality of operations comprises: indexing said plurality of operations based on said plurality of parallelization values.

17. The computer implemented method of claim 12, wherein executing a first portion and a second portion of said plurality of operations simultaneously comprises: accessing said shared resource by said plurality of parallel process threads based on locking said shared resource by said first portion and said second portion of said plurality of operations.

18. The computer implemented method of claim 12, wherein generating said report including said aggregation of said plurality of results comprises:
consolidating a first result with a second result based on said simultaneous execution of said first portion and said second portion of said plurality of operations.

* * * * *